United States Patent [19]

Knothe et al.

[11] 4,235,296
[45] Nov. 25, 1980

[54] CONTROL CIRCUIT FOR THE SWITCHING MOTOR OF SELF-STABILIZING BALANCES

[75] Inventors: Erich Knothe, Bovenden; Franz-Josef Melcher, Hardegsen; Franz Rossmann, Gottingen, all of Fed. Rep. of Germany

[73] Assignee: Sartorius GmbH, Göttingen, Fed. Rep. of Germany

[21] Appl. No.: 7,649

[22] Filed: Jan. 29, 1979

[30] Foreign Application Priority Data

Feb. 17, 1978 [DE] Fed. Rep. of Germany ....... 2805989

[51] Int. Cl.³ .......................... G01G 1/34; G01G 7/00
[52] U.S. Cl. .................................... 177/204; 177/212
[58] Field of Search ........................ 177/204, 212, 248

[56] References Cited

U.S. PATENT DOCUMENTS

| 4,106,580 | 8/1978 | De Masters et al. ............ 177/248 X |
| 4,153,124 | 5/1979 | Knothe et al. ................... 177/248 X |
| 4,189,017 | 2/1980 | Strobel et al. ........................ 177/212 |

Primary Examiner—George H. Miller, Jr.
Attorney, Agent, or Firm—Browdy and Neimark

[57] ABSTRACT

An automatic circuit is provided for a switching motor of electromechanical, self-stabilizing balance having electromechanical compensation. An analog transducer produces an analog measured value which triggers operation of a switching motor whenever an upper or lower limiting value is exceeded, the analog measured value being applicable to a display device. A computer, which actuates a control circuit for the switching motor and the display is connected to the analog transducer via an analog-digital converter, the converter being operatively arranged to derive fine information which is fed to the computer and high-speed coarse or preliminary information which is likewise supplied to the computer ahead of the fine information, which triggers said switching motor in event one or more limiting values is exceeded.

20 Claims, 2 Drawing Figures

CONTROL CIRCUIT FOR THE SWITCHING MOTOR OF SELF-STABILIZING BALANCES

BACKGROUND OF THE INVENTION

This invention relates to an automatic control for the switch motor of electromechanical, self-stabilizing balances provided with electromagnetic compensation. The invention relates more particularly to such balances from whose analog transducer an analog measured value, which triggers the operation of a switching motor, when an upper or lower limiting value is exceeded, can be supplied to a display device.

An automatic control circuit of this type is known from German Pat. No. 2,131,058. In this known control circuit, the analog measured value is fed to a digital voltmeter. Switches in the digital voltmeter are arranged to correspond to the limits of the display measurement range of this digital voltmeter. If these limits are reached or exceeded, these switches are closed after a delay of 2.5 seconds by a delay switching member which is a part of the digital voltmeter, triggering a switch weight adjustment device after a delay. A second delay is provided which disables the adjusting device for a specified delay of 2.5 seconds after the weights are switched. If the measured weight exceeds limits far beyond the original limits, this second delay can be cut out, but the first delay of 2.5 seconds, associated with the digital voltmeter, and lasting until switching is performed after a limiting value is reached, is retained. This known automatic switch weight adjustment device consequently has a measurement rate limit which cannot be taken into account in measuring processes which must be carried out frequently, especially in automated processes.

SUMMARY OF THE INVENTION

It is the principal object of the present invention to provide an automatic control circuit of the type mentioned above in which a very rapid motor weight switching can be carried out.

According to the invention, the stated object, as well as others which are to become apparent from the text below, is achieved by virtue of the fact that a computer which actuates a control for the switch motor and a display are connected to the analog transducer through an analog-digital converter circuit, and by the fact that the analog-digital converter circuit is so designed that in addition to providing fine information to the computer used for weighing, it also provides rapid coarse or preliminary information which is also supplied to the computer and precedes the fine information, the coarse information triggering operation of the switch motor whenever a limiting value is exceeded.

Advantageously, this design reveals larger weight shifts in the evaluating electronic circuitry, instaneously and with zero delay; rapid measurement to determine possible exceeding of limiting values is performed, possibly triggering immediate actuation of the switch motor. Therefore, the switch weights can be added or subtracted instantaneously as required, and the exact measurement to determine weight can be carried out in the electronic compensation range after the stabilization process.

Advantageously, a counter, operated at least by a portion of the analog-digital converter circuit, can be connected in the evaluating electronics ahead of the computer.

In order to achieve good response, the electronic compensation range can advantageously be greater than the weight range of a switch weight, and the upper and lower limiting values can be located within the limits of the electromagnetic compensation range.

Rapid actuation of the switch motor can be achieved advantageously if required by virtue of the fact that a high-resolution analog-digital converter is connected between the analog transducer and the computer and by the fact that a high-speed, coarse-resolution converter is connected in parallel to the high-resolution converter between the analog transducer and the computer. An upper and lower limiting value can be fed into the high-speed, coarse-resolution converter, and when the coarse and high-speed converter exceeds one of these measured values, an appropriate switching movement can be carried out before the high-resolution converter has performed its integration, i.e., a weight can be added or removed. This means that the operating speeds of the two converters are in the range of 1:100, indicating that rapid response is ensured by this design.

It is also possible advantageously to connect an integrating converter whose resolution and measurement time can be varied, between the analog transducer and the computer, so that both coarse and fine measurements are performed simultaneously. If the coarse measurement indicates that no limiting value has been exceeded, the fine measurement which has begun is completed; otherwise, a weight shift is carried out and a new fine measurement is initiated.

The response rate can advantageously be increased even further by virtue of the fact that the rate of a weight change can be determined and the fact that the analog-digital converter or converters is or are synchronizable as a function of this weight change rate. This means that a corresponding programed linear integration time is fed into the converters.

The circuit design can be simplified advantageously by virtue of the fact that only one high-resolution analog-digital converter is connected between the analog transducer and the computer, and this high-resolution converter can be synchronized and interrogated directly by the computer, bypassing the counter.

In this embodiment, measured values from submeasurements from the high-resolution analog-digital converter can be called up by the computer at specified time intervals, and compared with stored limiting values, whereby a switching motor is actuated immediately if predetermined stored limiting values are exceeded at the upper or lower limit. Consequently, response to a corresponding weight change occurs no later than the time interval required to perform the submeasurement, so that a decision can be made a long time before integration is complete as to whether corresponding switching with addition or subtraction of weights is required.

In order to reduce the storage capacity required for this purpose, measured value pairs from successive submeasurements can be called up from the high-resolution analog-digital converter advantageously by the computer at predetermined time intervals, and measured value differentials can be generated on the basis of these values, the differentials being comparable with stored limiting values, so that a switching motor actuation involving addition or subtraction of weights can be triggered if these limiting values are exceeded at the upper or lower limit. After integration time is past, the final measured value is once again compared with total accuracy with the limiting values.

An analog-digital converter according to German Auslegeschrift (Published Patent Application) No. 2,114,141 is especially suitable or can be easily adapted for use in the present invention.

Advantageously, a predetermined limiting value is exceeded at the upper or lower limit and the corresponding weight switching interrupts and restarts integration, so that successive operations are possible.

In order to carry out the operations described above even more rapidly, the switching motor can be a stepping switching motor advantageously, and the method of successive approximations can be used.

In order to save time and stabilization effort, the required limiting values can be determined advantageously by the computer itself from the preset zero point and the preset maximum load.

The methods of operation described hereinabove are preferably accomplished using a microprocessor. In order to input the measured values more rapidly into the microprocessor, the low-pass provided in each analog-digital converter can be designed so that it can be shut off and/or its time constant reduced. Advantageously, a control device can be provided to allow correction of the weight adjustment device, even when the weight value is accurate.

Weight control can also be optionally connectable and disconnectable advantageously in a compensation range, whereby the disconnecting device is rendered inoperable when the weight is exceeded and returns only as far as the selected weight switching step in the event the lower weight limit is exceeded. Only one switching step can be carried out by a selected weight switching step if the upper or lower weight limit is exceeded, the width of said switching step advantageously being selectable. In this design, the weight adjustment can be disconnectable when the line voltage is applied.

BRIEF DESCRIPTION OF THE DRAWINGS

Embodiments of the invention are described in the following with reference to the figures in the drawing.

DETAILED DESCRIPTION OF THE PREFERRED EMBODIMENTS

Figure 1:
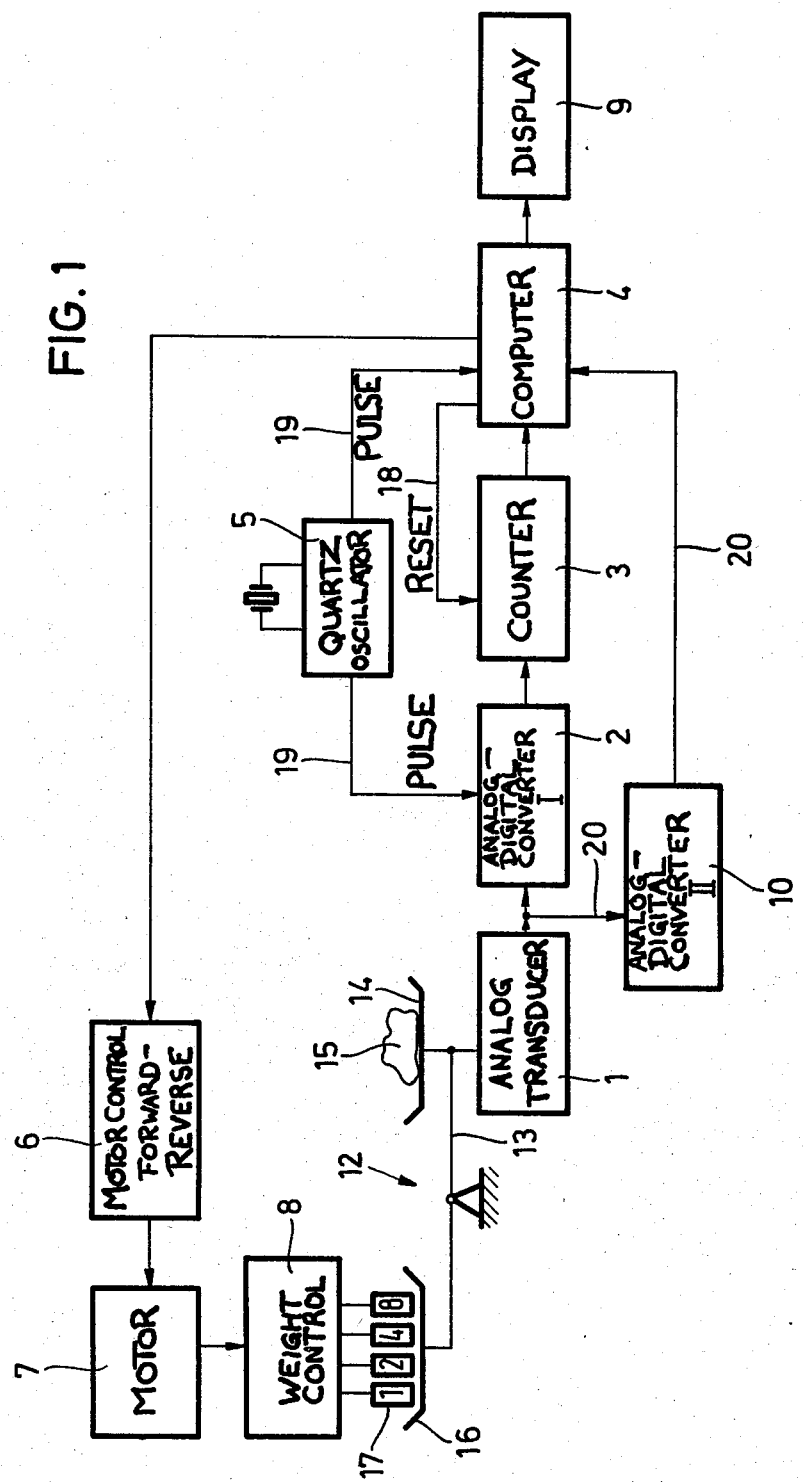
FIG. 1 is a schematic diagram of an embodiment of the present invention.

FIG. 1 is a schematic drawing of a balance 12, whose beam carries a pan 14 at one end to accept a load 15 and has a weight pan 16 at the other end, which serves to accept switching weights 17.

The balance 12 is provided with an electromagnetic compensating device, not shown in greater detail, which partially compensates for the load 15 within predetermined limits. The weighing result is determined from the applied weights 17 and a corresponding display on the compensating device, not shown.

The electromagnetic compensating device is provided with an analog transducer 1, which produces an analog measured value. For example, as is known, an analog voltage can be derived from the compensating current, and this voltage can be used as an analog measured value.

The transducer 1 is connected with a slow, high-resolution analog-digital converter (I) 2, which is connected in turn via a counter 3 to a computer 4. This computer 3 is a digital computer. A digital display 9 is driven by the computer 4. The computer 4 acts directly upon a motor control circuit 6, this control circuit being so designed that it can also execute a forward and a reverse control of the a switching motor 7 to which it is connected. The switching motor 7 can add or subtract the switching weights 17 on the pan 16, via a weight control circuit 8 in a known fashion. The switching weights 17, as indicated can be switched according to a binary code.

The computer 4 is connected by a line 18 to the counter 3 in order to reset the latter.

The computer 4 and the analog-digital converter 2 receive clock pulses from a quartz oscillator 5 via leads 19.

As shown in FIG. 1, a bypass line 20 is provided, connecting the analog transducer 1 to the computer 4, a high-speed, coarse-resolution analog-digital converter (II) 10 is connected in the bypass line 20.

The operation of the control shown schematically in FIG. 1 is now to be described with reference to a specific embodiment. It is assumed that the weighing range of the balance 12 is 166 g, and that the range of the electromagnetic compensation is 16 g, and that the load 15 is constituted by weights of 10 g. The weights 15 are switchable according to the binary code. This means that the compensating range is approximately 60% greater than that covered by each switching weight. In this embodiment, a lower and upper limiting value can be assigned to the high-speed, coarse-resolution analog-digital converter 2, for example a lower limit of 1 g and an upper limit of 14 g. When the high-speed, coarse-resolution analog-digital converter 10 measures a value during a measuring step, and such value is less than 1 g, a switching weight of 10 g is removed by the control circuit, consisting of the computer 4, the motor control circuit 6, the switching motor 7, and the weight control circuit 8. During the next measuring step a value of approximately 11 g is then measured, and this does not cause any further weight switching, so that the slow, high-resolution analog-digital converter 2 and the corresponding measurement circuit can operate to carry out a precise measurement after the direct switching correction is carried out.

If a value of 14 g, in the selected embodiment, is exceeded during measurement, the high-speed, coarse-resolution analog-digital converter 10 adds a switching weight via the control circuit. If this weight is only slightly more than 14 g, a measurement in the 4 g range will take place during the next measurement step, or slightly above this value, and this measurement will then be carried out again by the slow, high-resolution analog-digital converter 2 and the associated measurement circuit.

However, in this selected example, if this 14 g value is considerably exceeded, for example by another 10 g or more, the high-speed, coarse-resolution analog-digital converter 2 will again record the upper limit of 14 g or more, and another switching step will be triggered by the control circuit.

The high-speed, coarse-resolution analog-digital converter 10 requires relatively few stages, for example a thousand stages, or, for the sake of the simplest comparison, one thousand six hundred stages for the measurement range of 16 g, while the high-resolution, accurate, slow analog-digital converter 2 requires one hundred sixty thousand stages for the measurement range of 16 g in the embodiment described. A measurement time of approximately one second is required, whereby the total measurement time can consist for example of one hundred twenty-eight submeasurements of 7.81 ms each. The faster but coarse-resolution analog-digital converter 10 requires a measurement time of less than one hundredth of this time (one thousand or one thousand six hundred stages), namely less than 10 milliseconds, which corresponds roughly to the time required for one submeasurement by the slow, high-resolution analog-digital converter 2.

If we assume that no switching weight 17 is added, but the load 15 is in the vicinity of the upper limit of the measurement range of balance 12, all fifteen switching weights 17 will be added during the subsequent weighing before the actual, final measurement can be made. By connecting the high-speed, coarse-resolution analog-digital converter 10 in the manner shown in FIG. 1 and described above, a time is required for switching all fifteen switching weights 17 which is composed of a 15-times greater measuring time for the faster, coarse-resolution analog-digital converter 10, whose measurement time is less than 10 milliseconds, plus the dead time for stabilization during each measurement, determined by a series-connected low-pass filter, whereby this dead time is on the order of one second, i.e., an additional fifteen seconds. If it is not desired to use the high-speed, coarse-resolution analog-digital converter 10 in the circuit shown in FIG. 1, the measuring time will be considerably prolonged, since the measuring time will then consist of fifteen times one second measuring time of the high-resolution analog-digital converter 2 plus fifteen times one second of dead time. This time differential is of extraordinary importance in measurement processes which must be performed often, especially in cases when balance 12 is used as part of an automated process.

Figure 2:
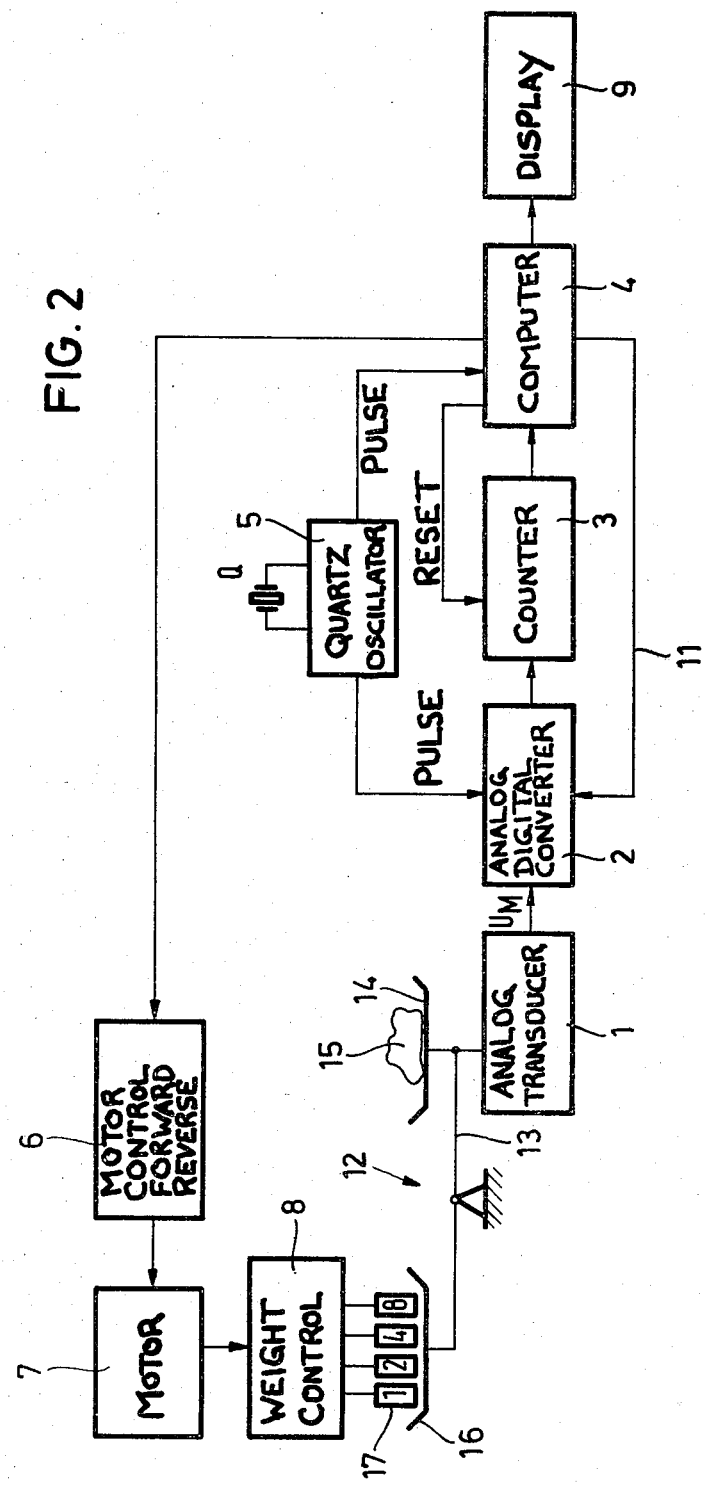
FIG. 2 is a schematic diagram of another embodiment of the present invention.

In the embodiment of the circuit shown in FIG. 2, the high-speed, coarse-measurement or coarse-integrating analog-digital converter 10 is no longer used. Instead, the computer 4 is connected by a lead, represented in the diagram by the numeral 11, with the high-resolution analog-digital converter 2 to synchronize this converter and to call up submeasurement values. In order to eliminate the disadvantage of the long integration time of the high-resolution analog-digital converter 2 and to achieve the same advantages which can be obtained by connecting a coarse-resolution analog-digital converter in parallel, submeasure values are recalled more often in specified time intervals during the integration time from the high-resolution analog-digital converter 2, and compared with stored corresponding limiting values. For example, as described above, if the high-resolution analog-digital converter performs one hundred twenty-eight submeasurements of 7.81 milliseconds each, the first submeasurement can be recalled after 7.81 milliseconds and compared with the corresponding pair of limiting values, so that if one of these limiting values (upper or lower) is exceeded, a weight can immediately be added or subtracted accordingly. It should be noted that this type of operation corresponds to an extremely short submeasurement time. The comparison naturally increases in accuracy a as the submeasurement approaches the final measured value, but the first submeasurement is sufficient to be able to carry out an immediate necessary compensation.

In order to reduce the needed storage capacity in the computer 4 or in the associated switching units required for this operation, the procedure set out below can be used.

During the integration time of the high-resolution analog-digital converter 2, successive submeasurement value pairs are recalled by the computer 4 and the difference is then calculated from these pairs, and then compared with corresponding upper and lower stored limiting values, whereby a corresponding weight correction is carried out immediately if a corresponding upper or lower limit is exceeded, without having to wait for the final integration, so that the switching process and consequently the entire weighing process are considerably accelerated. In both embodiments, the entire control circuit, consisting of the analog transducer 1, the analog-digital converter 2, the counter 3, the computer 4, the motor control circuit 6, the motor 7, and the weight control circuit 8 requires a period of time which permits for example an rpm for the motor 7 of eight rpm. In the embodiment shown, a time of 100 ms or less is available for each weight switch for measurement, computation, and deciding whether further switching is required or not.

Advantageously, in all of these techniques of operation described above, the procedure is such that integration is interrupted after the weights are switched and then restarted. A sequential method of operation is possible.

The necessary limiting values can be determined by the computer 4 itself from the predetermined zero value and the predetermined maximum load.

The analog-digital converters used can be switched to chamge their resolution and measurement time, and in particular can be synchronizable as a function of weight change rate, in other words, their programmed linear integration time is appropriately adjustable.

What is claimed is:

1. An automatic control circuit for a switching motor of an electomechanical, self-stabilizing balance having electromagnetic compensation and including an analog transducer which produces an analog measured value which is used to initiate operation of the switching motor whenever an upper or lower limiting value is exceeded and can be processed for display on a display, the control circuit comprising analog-to-digital converter circuit means coupled to said analog transducer and responsive to its output for producing high-speed coarse or preliminary information and fine information; computer means coupled to said analog-to-digital converter circuit means and responsive to its output for producing at least one switching signal in event at least one of the upper or lower limiting values is exceeded; and motor control circuit means coupled to said computer means and responsive to output thereof for producing signals to trigger said switching motor upon receipt of a switching signal from said computer means.

2. A control circuit according to claim 1, including a counter circuit connected between said computer circuit means and said analog-to-digital circuit means to delay the fine information.

3. A control circuit according to claim 1 or claim 2, wherein the balance has an electromagnetic compensating range greater than the weight range of a given switching weight and including means for establishing the upper and lower limiting values within limits of the electromagnetic compensating range.

4. A control circuit according to claim 1 or claim 2, wherein said converter circuit means includes a high-resolution analog-to-digital converter connected between said analog transducer and said computer circuit means and a high-speed, coarse-resolution analog-digital converter connected in parallel to said high resolution analog-digital converter between said analog transducer and said computer circuit means.

5. A control circuit according to claim 1 or claim 2, wherein said analog-to-digital circuit means comprises an analog-digital converter, which is an integrating device and can have it resolution and resolution time changed, connected between said analog transducer and said computer circuit means.

6. A control circuit according to claim 1 and claim 2, including means for determining rate of a weight change, said analog-to-digital converter circuit means being synchronizable as a function of this weight change rate.

7. A control circuit according to claim 1 or claim 2, including means by which integration is interrupted and restarted whenever either of the upper and lower limiting value is exceeded and a corresponding weight switch is executed.

8. A control circuit according to claim 1 or claim 2, wherein said switching motor is a stepping switching motor whereby a technique of successive approximations can be achieved.

9. A control circuit according to claim 1 or claim 2, wherein said computer circuit means includes means for determining limiting values from a predetermined zero point and a predetermined maximum load.

10. A control circuit according to claim 1 or claim 2, wherein said analog-to-digital converter circuit means includes at least two analog-digital converters each having a low-pass circuit which can be disconnected or its time constant reduced.

11. A control circuit according to claim 1 or claim 2 including additionally a display means coupled to an output of said computer means, measured values being displayed thereon.

12. A control circuit according to claim 1 or claim 2, including a weight adjustment device and a control device for correcting the weight adjustment device, even with the exact weight value.

13. A control circuit according to claim 12, wherein said control device can be connected and disconnected by a disconnecting device optionally within a compensation range.

14. A control circuit according to claim 13, wherein said disconnecting device is rendered ineffective when the weight is exceeded, and returns only to a selected weight switching step if the given lower limiting value is exceeded.

15. A control circuit according to claim 13, including means by which the limit on weight adjustment can be removed when the unit is connected to the line.

16. A control circuit according to claim 13, including means by which only one switching step can be carried out per selected weight switching step in the event that an upper or lower limit is exceeded.

17. A control circuit according to claim 16, including means by which the width of the weight-switching step is selectable.

18. A control circuit according to claim 2, wherein said analog-to digital converter circuit means comprises one high-resolution analog-digital converter connected between said analog transducer and said computer circuit means, said counter and said high-resolution analog-digital converter being directly synchronizable and interrogatable directly by said computer circuit means, bypassing said counter.

19. A control circuit means according to claim 18, wherein measured values of submeasurements from said high-resolution analog-digital converter are interrogatable at specified time intervals by said computer circuit means and comparable with stored given upper and lower limiting values, said motor control circuit means comprising motor control forward-reverse circuit means which is triggered whenever either of the given stored upper or lower limiting values is exceeded.

20. A control circuit according to claim 18, wherein measured value pairs of successive submeasurements can be called up from said high-resolution analog-to-digital converter circuit means by said computer means at specified time intervals, the measured value difference being formed therefrom, said differences being comparable with stored limiting values, said switching motor being triggered to operate whenever these upper or lower limits are exceeded.

* * * * *